United States Patent Office 3,243,304
Patented Mar. 29, 1966

3,243,304
METHOD FOR TREATING FARINACEOUS MATERIALS
Hugh K. Parker, Glen Ridge, N.J., assignor to Wallace & Tiernan Inc., Belleville, N.J., a corporation of Delaware
No Drawing. Filed July 10, 1961, Ser. No. 122,646
10 Claims. (Cl. 99—232)

This invention relates to methods and compositions useful for the treatment of farinaceous materials, such as flour, flour-containing cereal products, flour-containing dough products, flour-containing baking powders and the like. More particularly, this invention relates to the treatment of farinaceous materials, such as flour-containing materials, to provide improved baking properties. Still more particularly, this invention relates to methods and compositions useful for the aging or maturing of flour-containing materials.

It is known that farinaceous materials, such as flour-containing materials, are improved for baking purposes by a so-called maturing action which takes place upon storage in contact with air and it is known that much of the wheat flour is relatively unsuitable for baking immediately after milling in the absence of a special maturing or aging treatment. In the past it has been a practice to mature or age freshly milled flour by storing it in contact with air for rather long periods of time, as much as several months, more or less. A properly matured or aged farinaceous or flour-containing material is manifested, when employed to yield baked loaves of bread, by the following factors: the volume of the baked bread loaf for a given volume of flour or dough, the grain, texture, crust color and crumb color and other crumb or body characteristics of the baked bread loaf. In general, flour is matured or aged so that the resulting matured flour, when employed in the manufacture of bread and other baked products, yields bread and similar baked products which are light, soft and suitably moist yet sufficiently firm or resilient and have crust and body or internal properties of a pleasing and palatable nature.

A further important effect of the maturing of flour is the improvement in the rheological properties of dough made from the flour. A dough made from properly aged flour is smoother and less sticky and is in such physical condition that the baker can handle it with less difficulty through the various operations of mixing, kneading, developing and the like, usually involved in dividing, rounding, molding and panning operations in the manufacture of baked products.

Chemical agents have been employed to mature or age flour, the maturing or aging being effected in some instances simultaneously upon treatment or when the treated flour is incorporated in a dough mixture. Chemical agents which have been employed heretofore in the treatment of farinaceous material, such as flour, to mature or age the same include gaseous chlorine, chlorine dioxide and certain azodicarbonamides. Ascorbic acid has also been employed to mature or age flour.

These chemical agents have been employed alone in the treatment of flour and have been incorporated with other chemical agents, such as bleaching agents and dough improving agents and the like, to improve the appearance and physical properties of flour. For example, certain improving agents, such as bromates, e.g. potassium bromate, and iodates, have been employed in baking operations to produce certain desirable results in the ultimate loaf or other baked products, e.g. improved texture and loaf volume. These agents, however, in most cases do not fulfill all the requirements of maturing action in flour. Specifically, the bromates do not react in flour alone, either dry or wet, but act in the dough mix only as and after fermentation by yeast, with accompanying generation of acid, has occurred. These improving agents exhibit only a limited effect on the rheological properties of the dough. Accordingly, these improving agents, the bromates and iodates specifically, represent a class of agents that are generally known as dough improvers and are used in bakeries to make slight improvements or modifications in the baking properties of a flour which has already been matured.

Accordingly, it is an object of this invention to provide methods and compositions useful for the maturing of farinaceous materials, such as flour.

It is another object of this invention to provide methods and compositions for the rapid maturing of flour.

Another object of this invention is to provide a method and compositions useful for the maturing of flour, the compositions being particularly useful for incorporation in baking mixtures, such as flour-containing mixtures.

Still another object of this invention is to provide flour-containing baking compositions containing an aging or maturing agent effective upon use of baking composition.

Yet another object of this invention is to provide compositions useful for incorporation in admixture with flour or for incorporation in flour-containing baking compositions such that aging of the flour in contact therewith or admixed therewith is rapidly effected upon admixture or contact or when the resulting admixture is incorporated in a dough or batter.

How these and other objects of this invention are achieved will become apparent in the light of the accompanying disclosure.

In at least one embodiment of the practice of this invention at least one of the foregoing objects will be achieved.

It has now been discovered that farinaceous materials, such as flour, are matured or aged by means of an organic peroxide or compositions containing an organic peroxide, wherein the organic peroxide is present in water-soluble form. Organic peroxides which are water-soluble per se are particularly useful as aging or maturing agents in accordance with this invention. Organic peroxides which are per se relatively water-insoluble are, however, effective maturing agents in accordance with this invention when employed or available as maturing agents in water-soluble form. Water solubility may be imparted to a relatively or substantially water-insoluble organic peroxide by preparing or incorporating such an organic peroxide in a suitable carrier material, liquid or solid, which imparts water solubility to the normally water-insoluble organic peroxide. Suitable carriers or agents which impart water solubility or which tend to solubilize normally water-insoluble organic peroxides include such materials, liquids or solids, as surfactants or hydrotropic agents and the like which upon admixture with water or aqueous solutions tend to solubilize the normally water-insoluble organic peroxides therein.

Particularly useful as solubilizing agents for imparting water-soluble characteristics to a normally water-insoluble organic peroxide or for preparing or making available normally water-insoluble organic peroxides in water-soluble form are the normally liquid polar organic solvents which are water-miscible, completely or partially. Generally, the normally liquid polar water-miscible organic solvents suitable for imparting or increasing the water solubility of normally water-insoluble organic peroxides, or for maintaining or providing organic peroxides in a water-soluble form, include the oxygenated organic chemicals, i.e. compounds containing only carbon, hydrogen and oxygen atoms, such as the ketones, esters, alcohols, ethers and the like.

Suitable solvents for solubilizing or for maintaining or providing organic peroxides in a water-soluble form include such compounds, or mixtures thereof, as the alkyl phthalates, e.g. dimethyl phthalates, dibutyl phthalates, the ketones, e.g. mesityl oxide, an unsaturated ketone, the aliphatic esters, e.g. triacetin, a glycerol triester of acetic acid, and the like. In general, any water-miscible, organic solvent, such as a normally liquid polar organic compound containing only carbon, hydrogen and oxygen atoms, which is effective during treatment, preferably a solvent having a vapor pressure at a temperature in the range of 50–120° F. no greater than that of water, is a satisfactory solubilizing agent for imparting water solubility and/or for maintaining normally water-insoluble organic peroxides in a water-soluble form. In accordance with this feature of the invention, water solubility characteristics are imparted to an organic peroxide, such as a normally water-insoluble organic peroxide, e.g. cyclohexanone peroxide or benzoyl peroxide, by forming a solution of the organic peroxide in one of these solvents, such as dibutyl phthalate or triacetin. Then the resulting water-soluble form organic peroxide is employed to treat the farinaceous material to be matured. Maturing is effected when water is admixed with the treated farinaceous material, as in the dough making operation. Since the solvent in the treating solution is water-miscible and at the same time evidences a solubility for the organic peroxide, there is formed an aqueous organic peroxide-containing solution, the organic peroxide therein in effect being in substantially water-soluble form.

In the practice of this invention the normally water-soluble, organic peroxides are preferred. The normally water-insoluble, organic peroxides when solubilized or available in or presented in water-soluble form are also useful and yield satisfactory results. Of the organic peroxides, those organic peroxides which permit synthesis in water-soluble form are particularly preferred. Of this group the ketone peroxides, including the aliphatic and cycloaliphatic ketone peroxides are particularly suitable, such as acetone peroxide, methyl ethyl ketone peroxide, diethyl ketone peroxide, ethyl isopropyl ketone peroxide, dipropyl ketone peroxide, methyl propyl ketone peroxide, acetylacetone peroxide, methyl isobutyl ketone peroxide, propyl butyl ketone peroxide and cyclohexanone peroxide. In general, ketone peroxides, aliphatic and cycloaliphatic, and indeed any organic peroxide, especially those containing from 3 to 18 carbon atoms per molecule, desirably not more than 12 in the case of ketone peroxides which are per se in water-soluble form, are particularly suitable and are preferred for use in the practice of this invention.

Ketone peroxides when first synthesized are in monomeric form with each molecule containing one or two hydroperoxy groups. If these ketone peroxides are permitted to stand under suitable conditions, they will dimerize and continue to condense to form trimers and higher species. Generally, the monomeric and dimeric forms of the aliphatic ketone peroxides, such as acetone peroxide, methyl ethyl ketone peroxide, methyl propyl ketone peroxide and the like, are quite water-soluble and are very advantageous for use in accordance with the practice of this invention for maturing flour, especially when in a form that further condensation will not occur, such as by dissolution in a proper solvent or by dilution.

Ketone peroxides useful in the practice of this invention may be represented by the formulas (A) 

(B) 

wherein R and R' are the same or different aliphatic groups, such as alkyl groups containing from 1 to 4 carbon atoms per group or wherein R and R' together make up a cycloaliphatic group such as the cyclohexane ring in the case of cyclohexanone.

Ketone peroxides of the type illustrated in Formulas A and B tend to condense, particularly under the influence of small amounts of acid, to yield ketone peroxides having the formula (C) 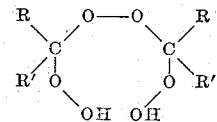

A more generalized formula is (D) 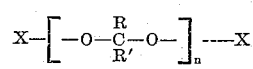

wherein X is OH. When attempt is made to make a ketone peroxide wherein $n$ is greater than 2, e.g. wherein $n$ is 3, ring closure usually takes place producing a ketone peroxide having a cyclic structure illustrated in the formula (E) 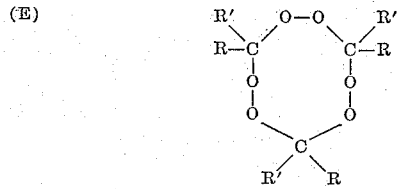

Ketone peroxides are formed by reacting a ketone such as methyl ethyl ketone with hydrogen peroxide in the presence of a non-aqueous, water-miscible solvent such as dimethyl phthalate. The ketone peroxide-forming reaction is arrested by the use of a liquid diluent or solid such as $CaSO_4$ to take up the water formed during the reaction. When so produced, ketone peroxides, wherein $n=1$, are generally in water soluble form. These ketone peroxides however readily tend to form corresponding dimers and trimers, see Formulas C, D and E, which tend to be water-insoluble. The formation of these less desirable, water-insoluble dimers and trimers can be arrested by the addition of water absorbing dry solids or solvents or diluents to the initial ketone peroxide reaction mixture containing the ketone peroxides having Formulas A and B.

Cyclic ketone peroxides tend to be shock sensitive and are less useful as maturing agents in accordance with the practices of this invention because they necessitate special handling. Non-cyclic, i.e. without ring closure, ketone peroxides of the type of Formula D are possible and are preferred. In actual practice, a ketone peroxide such as ketone peroxide derived from the peroxidation of methyl ethyl ketone is usually a mixture of peroxides having the Formulas A, C and E. This is also true of ketone peroxides derived from cyclohexanones and in this case the R and R' together make up the cycloaliphatic, e.g. cyclohexane ring. Other organic peroxides which exhibit little, if any, water solubility, as typified by benzoyl peroxide (F) 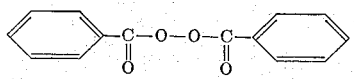

are also useful in the practice of this invention when these normally water-insoluble organic peroxides are provided or are available in water-soluble form for effective maturing action.

In carrying out the aging or maturing of farinaceous materials, such as flour, by employing an organic peroxide treating agent of this invention it is desirable to utilize a composition containing the organic peroxide in water-soluble form, or in a form, such that it is available for dissolution in water and aqueous solutions and the like when the composition is applied to the farinaceous material by thorough admixture therewith. Generally, a carrier or diluent is employed with the organic peroxide. It is preferred that the carrier be a very finely pulverulent material suitable for effective mixing with flour, examples of suitable carriers being starch, i.e. in the form of corn starch, flour, sodium chloride (common table salt), all of these being essentially inert materials so far as treatment of the flour is concerned. Other inorganic salts can be employed, such as other mineral acid salts, particularly chlorides, sulfates and phosphates of alkali metals and alkaline earth metals, including ammonium salts. The selected carrier should be a stable, non-toxic and harmless material and such as to introduce no undesirable odor or taste in the farinaceous material or flour undergoing treatment. Where the addition of the maturing agent is made directly to the flour an ash-free material, such as starch or flour itself, is employed as the carrier for admixture with the organic peroxide. Similar compositions can be used for incorporating in a dough or in a batter or in a dry mix to be made just before dough preparation but a carrier, such as salt, sodium chloride, is also satisfactory at this stage. It will be appreciated that the carrier effectively facilitates incorporation and dispersal or distribution of the active agent, the organic peroxide within the flour or dough mixture, i.e. so that the organic peroxide more or less uniformly reaches all portions of the mass or stream of flour undergoing treatment. There might also be incorporated in the carrier a surfactant or water-solubilizing agent or solvent, liquid or solid, for the active organic peroxide maturing agent employed in addition to that already available, if present or required, to place the organic peroxide in water-soluble form. This added surfactant or water-solubilizing agent or solvent may be incorporated in the carrier or otherwise associated with the organic peroxide to better maintain the organic peroxide in water-soluble form or to provide means for making the organic peroxide available in water-soluble form.

A further feature of the invention is that the organic peroxide-containing compositions may also include other ingredients useful for making bread either as part or all of the carrier. For example, the preparations of this invention to be employed for treating the flour or dough or batter at the bakery, may include not only salt, but additionally or alternatively such materials as yeast food salts which are commonly employed. These latter substances include one or more compounds, such as calcium sulfate, sodium chloride and ammonium chloride.

It is also possible to combine the organic peroxide maturing agent, particularly where the maturing treatment is to be effected at the flour mill or otherwise in the flour sometime prior to use in making dough or batter, with other active agents which are commonly employed for bleaching of flour. Thus, combinations of a water-soluble form organic peroxide, together with a bleaching agent and additional carrier material, such as potassium alum, calcium carbonate and calcium phosphates have been found to constitute effective agents for maturing and bleaching flour in a substantially single treatment operation. These active ingredients appear to be entirely compatible with no deteriorating or other objectionable effect on one of the components by reasons of the presence of another one of the components. It will be understood that when such a preparation is mixed with the flour in the dry state the bleaching operation commences promptly and continues over a period of time while the maturing action is somewhat delayed until the treated flour is ultimately made up with water in the course of preparing dough or batter.

In this connection it is pointed out that, although benzoyl peroxide has been known and employed as a bleaching agent in the treatment of flour, its utility as a maturing agent has remained undiscovered until this invention. Benzoyl peroxide, when employed in a bleaching operation is employed in water-insoluble form, has no significant maturing action on the flour undergoing treatment due to the fact it is substantially water-insoluble. Maturing of farinaceous material, such as flour, is effected by oxidation carried out by means of oxidizing agents. The oxidizable groups in flour and similar farinaceous materials which must be acted upon or influenced by a maturing agent to effect maturing of the flour are in the hydrophilic phase. Accordingly, the maturing agent to be effective should desirably have hydrophilic properties, e.g. exhibit solubility in water or a highly polar solvent or be available when maturing is to be effected, such as in dough preparation or batter preparation, in a water-soluble form. Benzoyl peroxide is substantially water-insoluble and does not contribute to the maturing of flour when employed as a bleaching agent because it is dissolved in the oil phase of the flour where the pigments are and is, accordingly, prevented from coming in contact with the oxidizable hydrophilic groups of the flour which must be oxidized during maturing to impart the desired baking properties to the flour.

The amount of organic peroxide maturing agent to be employed for optimum results varies with the specific type and composition of such agent and also with the kind of flour. Optimum results are defined as optimum maturing action and the maturing action will be incomplete if there is insufficient organic peroxide maturing agent employed. However, excess of the agent may also result in an overtreated condition of the flour, which is somewhat less desirable than the effect of best maturing, such over-treated condition being observable, for example in the ultimate bread, as a somewhat smaller volume of loaf (with a given weight of flour) and a somewhat coarser texture, than the optimum. As will be appreciated, optimum amounts for a given agent and a given flour are readily determinable by simple test, e.g. baking tests such as are conventional in both the milling and baking industries for control of flour treatment operations or of dough making.

Usually an amount of organic peroxide, upwards of a few parts per million by weight, e.g. 20 parts per million by weight based on the organic peroxide and the flour or farinaceous material undergoing treatment, yields satisfactory results and as much as 500 parts per million by weight, or more, might be employed if necessary or desired. Stated in other weight units, ordinarily the amount of organic peroxide employed is usually in the range from 1 to 20 grams, more or less, of organic peroxide per hundredweight (100 lbs.) of flour. The total, effective amount of organic peroxide required to mature or age the flour undergoing treatment may be added in one operation, such as during the milling and/or bleaching operation, or during the dough preparation or batter preparation step just prior to baking or, if desired, a part of the total, required effective amount may be added at one time, such as during milling, and the remaining, effective portion subsequently added to the flour, such as during the dough or batter preparation operation.

Whether the organic peroxide maturing agent is added directly to the flour, such as during milling and/or bleaching or during the dough or batter operation, the same maturing effect can be obtained. Ordinarily, it is preferred to add the organic peroxide to the flour at the flour mill since in this way a more uniform distribution of the organic peroxide in the treated flour is obtained and the control of the amount of organic peroxide per unit weight of flour treated is more precise.

As a further statement of the methods of aging flour in accordance with this invention, the maturing operation may be carried out in various ways as by mixing the organic peroxide maturing agent (preferably in a composition embodying carrier material) with dry flour to be matured in appropriate amount (such as from 20 to 500 p.p.m. by weight, depending on the flour, the agent used and the results desired) or by admixing the agent or composition containing it with dough or partly prepared dough or with various mixes that include flour and that are to be used in making baked products. The maturing treatment is particularly important for wheat flour of various classes and types, ordinarily known as white flour, but may also be used with other cereal milling products, such as whole wheat flour and mixtures of ordinary wheat flour with whole wheat or rye flours.

Where the treatment with the organic peroxide maturing agents is to be employed at the bakery, for example in connection with the making of bread dough or other yeast-leavening dough, the agents or compositions of this invention can be incorporated at any suitable time, preferably at an early stage in the dough making process. For example, if the straight dough process is used, the active agent is conveniently incorporated with the flour or with the entirety of the ingredients as the mix is made up at the very outset of the procedure.

In the case of the sponge dough process, the agent can be incorporated at the time the ingredients are mixed for the sponge and then if more complete advantages of matured flour are desired, further quantities of the agent can be incorporated at the time of final dough-up, when additional flour and water are added. In some such cases it may not be necessary to add further maturing agent; alternatively, if a matured condition is not required during sponge preparation and fermentation, the inclusion of the active agent can be postponed until final dough-up. If dough is made by the broth process, utilizing a fermented, yeast-containing broth and omitting long fermentation of the dough, the maturing agent can be included with the flour at the time of mixing or added directly to the dough at the outset of the mixing operation. The maturing action, as explained, is promptly accomplished in all dough mixtures, so that full advantages of matured flour are readily obtained in the mixing operation itself and especially in the handling of the dough after mixing, and most significantly, in the properties of the ultimate bread or other product. Of course, the maturing agent can be added to the flour in advance of any dough mixing step, or even long before, if such practice is more convenient. It will be understood that the term "dough" (unless otherwise indicated) is used to include sponge as prepared for making bakery products by the sponge process.

The flour treating compositions of this invention, to be used in such treatment by application to flour itself (as at the flour mill or later), or to various doughs (including sponges and batters) or other mixes, can be embodied in various forms, including suitable carrier and other ingredients, all preferably in a finely divided state so as to facilitate mixing. Purely by way of illustration, the following are specific examples of some useful compositions. In each case the amounts of ingredients are set forth in percentage by weight of the complete composition, and unless otherwise stated all ingredients are incorporated as fine powders.

EXAMPLE I

An effective composition, especially for treating dry flour at the mill, consists of the following:

| | Percent |
|---|---|
| Water soluble form methyl ethyl ketone peroxide | 2–15 |
| Corn starch | 85–98 |

EXAMPLE II

The following composition, particularly designed to be employed at flour mills or in like for the treatment of dry flour, provides both a maturing and a bleaching action, the several inorganic compounds serving collectively as a carrier. This composition, like that of Example I, is prepared in a very finely pulverulent form:

| | Percent |
|---|---|
| Water soluble form methyl ethyl ketone peroxide | 5–25 |
| Dibenzoyl peroxide | 20–30 |
| Carrier: | |
|     Potassium alum | 30–40 |
|     Calcium carbonate | 5–10 |
|     Dicalcium phosphate | 5–10 |
|     Tricalcium phosphate | 2–8 |

EXAMPLE III

This composition is especially useful for incorporation with dry flour or with dough mixes or directly in dough at bakeries, e.g. where dough is made by the straight dough process or where the dough is partially prepared in the form of sponge, the additive being incorporated in the sponge mixture as it is made up. In particular, the composition contains not only the maturing agent but also yeast food salts of conventional utility in dough making operations wherein the bread or equivalent dough is subjected to a long fermentation period. The flour in the composition serves as carrier for all ingredients, the yeast food salts themselves cooperating as a carrier for the maturing agent. The following is a suitable formula for the composition:

| | Percent |
|---|---|
| Water soluble methyl ethyl ketone peroxide | 0.1–0.5 |
| Calcium sulfate | 20–30 |
| Sodium chloride | 20–30 |
| Ammonium chloride | 5–15 |
| Flour | 30–50 |

EXAMPLE IV

In this preparation a ketone peroxide is employed in combination with sodium chloride as a carrier, the ketone peroxide being conveniently dissolved in a suitable solvent such as dimethyl phthalate and the solution then applied to the pulverulent or otherwise very finely divided sodium chloride. As a result the organic peroxide maturing agent is deposited in water-soluble form on the sodium chloride particles, thereby providing an essentially uniform mixture of the active agent and carrier suitable for admixture with flour in the same fashion as the powder compositions of Examples I and II. The following proportions may be employed:

| | Percent, dry solids basis |
|---|---|
| Water soluble form organic peroxide such as cyclohexanone peroxide | 0.1–2.0 |
| Sodium chloride (carrier) | 98–99.9 |

EXAMPLE V

In this composition, the active agent is water soluble methyl isopropyl ketone peroxide:

| | Percent |
|---|---|
| Methyl isopropyl ketone peroxide | 2–30 |
| Corn starch (carrier) | 70–98 |

EXAMPLE VI

In this case the water soluble organic peroxide is mixed with another type of carrier, also appropriate for use in flour and baked products:

| | Percent |
|---|---|
| Methyl ethyl ketone peroxide | 25.0 |
| Dicalcium phosphate | 75.0 |

As explained, all of the examples are very preferably prepared in powder or equivalent form, with the ingredients uniformly mixed or dispersed. When the composition is applied, the amount used will be such as to provide the desired amount of active water soluble form organic peroxide relative to the flour for the desired maturing action. In mixing compositions of this type with dry flour, it will be understood that known feeding and mixing devices may be employed.

Further explanatory of the practices of this invention and illustrative of the advantages obtainable thereby, the following additional examples are presented. In the examples set forth hereinbelow the following recipe was used for the bread in these tests:

|  | Grams |
|---|---|
| Flour, on a 14% moisture basis | 100 |
| Sugar | 5 |
| Salt | 2 |
| Shortening | 3 |
| Yeast | 5 |

Water, up to 61 to 64% absorption.

In some cases a sufficient quantity of this mixture to make ½ lb. loaves was employed; in other cases 1 lb. bread loaves were baked.

The bread was evaluated by the following criteria.

*Volume.*—This is directly measured in cubic centimeters by determining the volume displaced by the loaf of bread. The volumes are given in the examples in cubic centimeters per loaf. One measure of the effectiveness of the maturing agent is the increase in loaf volume.

*Grain and texture score.*—This is a measure of the fineness of the grain and the silkiness of the texture of the sliced bread. It is an arbitrary scale based on an imaginary ideal loaf bread which would be scored as 100. Most loaves of bread made by the recipe herein used received scores between 90 and 99. Some loaves baked without maturing agents will score in the low 90's whereas a well-matured loaf will be scored around 98. Plus and minus indications are used to further modify the numbers.

*Maturing.*—This is a visual grading of the outside appearance of the baked loaf taking into consideration such things as boldness and smooth or rough break. The score is expressed in terms of letters ranging from G which means "green" and applies to a poor loaf through M which means "fully matured" to O which means "overtreated." Plus or minus modifications are also used here, a plus meaning a score somewhere between the letter given and the next higher one.

The following samples of flour were used in the tests of the following examples.

*Flour A.*—This is a typical spring wheat patent blend that shows good response to maturing agents. It is a freshly milled immature flour which has 12.4% protein and .44% ash.

*Flour B.*—This is a clear flour from a southwestern flour containing 13.5% protein and .65% ash. Being a clear flour it is of low grade and quite immature and requires higher treatment rates to produce good bread.

*Flour C.*—This is a southwestern patent flour. While it is an immature flour, being a patent, it shows less response to maturing agents. The protein content is 11.4% and the ash 0.41%.

The following examples demonstrate the maturing action of the compositions of this invention:

EXAMPLE VII

This test was carried out with methyl ethyl ketone peroxide as a 60% solution in dimethyl phthalate. Flour A was used and the peroxide composition was added to the dough. One pound loaves were baked. The following table shows the results:

| Peroxide Dose, gm./cwt. flour | Loaf Volume | Grain and Texture | Maturing |
|---|---|---|---|
| 1.36 | 2,540 | 94 | M− |
| 2.72 | 2,585 | 96 | M+ |
| 0 | 2,390 | 92 | G− |

It is seen that optimum improvement is obtained with a treatment of 2.72 grams of peroxide per hundred-weight of flour.

EXAMPLE VIII

This test was carried out with methyl ethyl ketone peroxide in dimethylphthalate added directly to the dough which was made from Flour B and baked into ½ lb. loaves. The solution of the peroxide contained 1.7% methyl ethyl ketone peroxide by weight. A dose of 3.28 grams of peroxide per hundredweight of flour gave an increase in loaf volume from 660 to 775, an improvement in grain and texture score from 93− to 97+ and an improvement in the maturing score from G to M.

EXAMPLE IX

Methyl ethyl ketone peroxide dissolved in dimethyl phthalate was added to the flour which was then baked into bread. In all cases there was sufficient solvent used to give a constant ratio of 190 grams of solvent per hundredweight of flour to avoid variations caused by different amounts of solvent. Flour B was used and was baked into ½ lb. loaves. The results are shown in the following table.

| Peroxide Dose, gm./cwt. flour | Loaf Volume | Grain and Texture | Maturing |
|---|---|---|---|
| 0 | 660 | 93− | G |
| 1.64 | 765 | 97− | M |
| 3.28 | 760 | 97 | M |
| 6.55 | 775 | 97+ | M+ |
| 13.1 | 785 | 98− | O |

It is seen that the optimum result was obtained with a peroxide dose of 6.55 grams per hundredweight of flour. This gave the optimum on the maturing score and demonstrated great improvement with respect to loaf volume and the score on grain and texture.

EXAMPLE X

This example illustrates the use of a water soluble ketone peroxide, viz. methyl ethyl ketone peroxide, diluted with a solid diluent, viz. magnesium carbonate. Here a mixture of one part of the peroxide and 1.25 parts of the solid diluent were added to Flour A and this was then baked into ½ lb. loaves. The results are shown in the following table.

| Peroxide Dose, gm./cwt. flour | Loaf Volume | Grain and Texture | Maturing |
|---|---|---|---|
| 0 | 750 | 94 | G+ |
| 5.1 | 785 | 97− | M− |
| 10.2 | 750 | 98 | M |
| 20.4 | 775 | 97 | M+ |

It is seen that the optimum dose was approximately 10.2 grams per hundredweight of flour. Higher doses would give further improvement in the maturing score but apparently would do harm to grain and texture without greatly increasing loaf volume.

EXAMPLE XI

A mixture of one part of methyl ethyl ketone peroxide and 2.5 parts of dicalcium phosphate was added to Flour A which was baked into ½ lb. loaves. The results are given in the following table.

| Peroxide Dose, gm./cwt. flour | Loaf Volume | Grain and Texture | Maturing |
|---|---|---|---|
| 0 | 750 | 94 | G+ |
| 5.1 | 740 | 96− | M− |
| 10.2 | 820 | 96+ | M− |
| 20.4 | 740 | 96 | M− |

It is demonstrated by Examples X and XI that the dose of peroxide necessary for the optimum result is the same regardless of which of the two fillers is used.

EXAMPLE XII

Cyclohexanone peroxide was incorporated in dibutyl phthalate as a 50% suspension and the resulting admixture was added to the dough. The latter was made using Flour A and 1 lb. loaves were baked. The results are shown in the following table.

| Peroxide Dose, gm./cwt. flour | Loaf Volume | Grain and Texture | Maturing |
|---|---|---|---|
| 0 | 2,390 | 92 | G− |
| 1.86 | 2,460 | 93 | G |
| 3.72 | 2,470 | 94 | G+ |
| 18.6 | 2,450 | 96 | O |

A treatment of approximately 4 grams per hundredweight of flour would give excellent improvement. There is a considerable increase in loaf volume and improvement in the grain and texture score and the loaf is almost fully matured.

The following examples demonstrate the effectiveness of benzoyl peroxide as a maturing agent. Heretofore benzoyl peroxide had not been used for maturing flour. However, in the solvents used here benzoyl peroxide is shown to be a reasonably effective maturing agent.

EXAMPLE XIII

The benzoyl peroxide was used as an 8% by weight solution in mesityl oxide. It was added in a dosage of 10.9 grams per hundredweight of flour, Flour B being used. In one case the peroxide solution was added to the flour before baking and in the other case it was added to the dough. ½ lb. loaves were baked. The results are shown in the following table:

| Added to— | Loaf Volume | Grain and Texture | Maturing |
|---|---|---|---|
| Control | 660 | 93− | G |
| Flour | 765 | 97+ | M+ |
| Dough | 790 | 98 | M |

It is seen that this treatment gave excellent improvement whether added to the dough or to the flour.

EXAMPLE XIV

The same solution as in Example XIII was added to Flour C to give a dose of 10.9 grams per hundredweight of flour and ½ lb. loaves were baked. The volume increase was negligible but the grain and texture score was increased from 96+ to 98+ while the maturing score was increased from M− to M+. Flour C is the patent flour in which an untreated control shows a good score and which is not as susceptible to oxidation as the other flours.

EXAMPLE XV

Benzoyl peroxide in triacetin was added to the flour before baking. Flour B was used and for all doses sufficient solvent was added to give a constant concentration of 310 grams of solvent per hundredweight of flour. The treated flour was baked into ½ lb. loaves. The results are shown in the following tabulation:

| Peroxide Dose, gm./cwt. flour | Loaf Volume | Grain and Texture | Maturing |
|---|---|---|---|
| 0 | 690 | 93 | G+ |
| 2.72 | 750 | 97 | M |
| 5.45 | 725 | 96+ | M |
| 10.9 | 775 | 98− | M+ |

It will be seen that a dose of 10.9 grams per hundredweight of flour gave excellent improvement in volume, in grain and texture and in maturing. It is possible that a higher dose would have given still better results but the maturing score shows that a very much higher rate of treatment would have been excessive.

It will be apparent that diluents and organic peroxides and compositions other than those given in the examples could be used. Any diluent which is compatible with the peroxide, which has the necessary physical properties and which is hydrophilic in nature should be suitable.

As will be apparent to those skilled in the art in the light of the foregoing disclosure, many modifications, variations and alterations are possible in the practice of this invention without departing from the spirit or scope thereof.

I claim:

1. A method for treating farinaceous material to mature it comprising admixing with said farinaceous material a composition comprising a normally water-insoluble organic peroxide and a solubilizing agent for said organic peroxide whereby water-solubility is imparted to said normally water-insoluble organic peroxide, said solubilizing agent comprising a normally liquid, water-miscible polar organic compound containing only carbon, hydrogen and oxygen atoms, said compound having a vapor pressure at a temperature in the range 50–120° F. not greater than that of water.

2. A method in accordance with claim 1 wherein said organic peroxide is a methyl ethyl ketone peroxide.

3. A method in accordance with claim 1 wherein said organic peroxide is a methyl propyl ketone peroxide.

4. A method in accordance with claim 1 wherein said organic peroxide is cyclohexanone peroxide.

5. A method in accordance with claim 1 wherein said organic peroxide is benzoyl peroxide.

6. A method in accordance with claim 1 wherein said organic peroxide is a ketone peroxide.

7. A method in accordance with claim 1 wherein said water-miscible polar organic compound is triacetin.

8. A method in accordance with claim 1 wherein said water-miscible polar organic compound is dimethyl phthalate.

9. A method in accordance with claim 1 wherein said water-miscible polar organic compound is dibutyl phthalate.

10. A method in accordance with claim 1 wherein said water-miscible polar organic compound is mesityl oxide.

References Cited by the Examiner

UNITED STATES PATENTS

| 1,483,546 | 2/1924 | Gelissen | 99—232 |
| 1,539,701 | 5/1925 | Sutherland | 99—232 |
| 1,687,804 | 10/1928 | Stoddard et al. | 99—232 |
| 1,754,914 | 4/1930 | Stoddard | 99—232 |
| 1,866,412 | 7/1932 | Van der Lee | 99—232 |
| 2,903,361 | 9/1959 | Marks et al. | 99—232 X |

FOREIGN PATENTS

| 444,544 | 3/1936 | Great Britain. |

OTHER REFERENCES

Jorgensen: Studies on the Nature of the Bromate Effect, Oxford University Press, London, 1945 (English ed.) page 34.

A. LOUIS MONACELL, *Primary Examiner.*

ABRAHAM H. WINKELSTEIN, D. M. STEPHENS,
*Examiners.*